(12) United States Patent
Duffy

(10) Patent No.: US 7,195,290 B2
(45) Date of Patent: Mar. 27, 2007

(54) APPARATUS FOR A FIRE-RATED DUCT

(76) Inventor: William Christopher Duffy, 76 German Mills Road, Thornhill, Ontario L3T 4H7 (CA)

( * ) Notice: Subject to any disclaimer, the term of this patent is extended or adjusted under 35 U.S.C. 154(b) by 0 days.

(21) Appl. No.: 10/705,967

(22) Filed: Nov. 13, 2003

(65) Prior Publication Data

US 2005/0116470 A1    Jun. 2, 2005

(51) Int. Cl.
F16L 25/00    (2006.01)
F16L 23/00    (2006.01)
F16L 9/22     (2006.01)

(52) U.S. Cl. .................. 285/424; 285/405; 138/109; 138/155; 138/DIG. 4

(58) Field of Classification Search ............. 285/363, 285/364, 405, 424; 138/109, 148, 155, DIG. 4
See application file for complete search history.

(56) References Cited

U.S. PATENT DOCUMENTS

| | | | | |
|---|---|---|---|---|
| 2,183,174 A | * | 12/1939 | Smith | ............ 138/39 |
| 2,226,523 A | * | 12/1940 | Peck | ............ 285/55 |
| 3,198,561 A | | 8/1965 | Witt | |
| 3,630,549 A | | 12/1971 | Grimm | |
| 3,800,846 A | * | 4/1974 | Kurz | ............ 160/35 |
| 3,811,714 A | * | 5/1974 | Pintard | ............ 285/229 |
| 3,923,326 A | | 12/1975 | Mez | |
| 4,133,566 A | | 1/1979 | Miller | |
| 4,380,188 A | * | 4/1983 | Nichols | ............ 454/297 |
| 4,509,778 A | | 4/1985 | Arnoldt | |
| 4,537,430 A | | 8/1985 | Sullivan | |
| 4,557,297 A | * | 12/1985 | Montana | ............ 138/141 |
| 4,572,553 A | | 2/1986 | Geldner | |
| 4,662,661 A | * | 5/1987 | Arnoldt | ............ 285/363 |
| 4,725,083 A | * | 2/1988 | Schauer | ............ 285/405 |
| 4,765,375 A | | 8/1988 | Nakajima | |
| 4,804,207 A | * | 2/1989 | Berchem et al. | ............ 285/16 |
| 4,836,585 A | | 6/1989 | Schauer | |
| 4,940,264 A | * | 7/1990 | Mez | ............ 285/405 |
| 5,069,484 A | | 12/1991 | McElroy | |
| 5,103,549 A | | 4/1992 | Meinig et al. | |
| 5,129,690 A | | 7/1992 | Meinig et al. | |
| 5,133,580 A | | 7/1992 | Meinig | |
| 5,135,270 A | | 8/1992 | Arnoldt et al. | |
| 5,171,184 A | * | 12/1992 | Saucier et al. | ............ 454/257 |
| 5,219,403 A | * | 6/1993 | Murphy | ............ 137/561 A |
| 5,378,028 A | | 1/1995 | Issagholian-Havai et al. | |

(Continued)

FOREIGN PATENT DOCUMENTS

GB    2 284 989 A    6/1995

(Continued)

OTHER PUBLICATIONS

Canadian Office Action, dated Aug. 2, 2006, Canadian Patent Application No. 2,450,977 (3 pages).

*Primary Examiner*—James M. Hewitt
(74) *Attorney, Agent, or Firm*—Dinesh Agarwal, P.C.

(57) ABSTRACT

A duct system comprising duct sections which are factory manufactured and field modifiable. The field modifiable duct system comprises fire resistant materials and is fire-rated. The duct sections when assembled create a continuous conduit that allows air to flow from a fresh air source to the required area of the building.

16 Claims, 6 Drawing Sheets

U.S. PATENT DOCUMENTS

| | | | |
|---|---|---|---|
| 5,450,879 A * | 9/1995 | Toben | 138/109 |
| 5,564,758 A | 10/1996 | Tiberio | |
| 5,575,131 A * | 11/1996 | Menchetti | 52/745.09 |
| 5,653,482 A | 8/1997 | Ficchi, Jr. | |
| 5,673,947 A | 10/1997 | De Waal | |
| 5,775,414 A * | 7/1998 | Graham | 165/158 |
| 5,865,478 A * | 2/1999 | Lin | 285/405 |
| 6,109,665 A | 8/2000 | Meinig | |
| 6,148,867 A * | 11/2000 | Matthews et al. | 138/149 |
| 6,213,522 B1 * | 4/2001 | Jacobson et al. | 285/64 |
| 6,231,704 B1 * | 5/2001 | Carpinetti | 156/71 |
| 6,412,519 B1 | 7/2002 | Goodhue | |
| 6,460,573 B1 | 10/2002 | Fischer et al. | |
| 6,471,256 B1 | 10/2002 | Fischer | |
| 6,502,716 B1 * | 1/2003 | Kolesar | 221/1 |
| 6,505,864 B1 | 1/2003 | Shuey | |
| 6,547,287 B1 | 4/2003 | Shah et al. | |
| 6,550,823 B1 | 4/2003 | Siegwart | |
| 6,561,553 B1 | 5/2003 | Issagholian-Havai | |
| 6,758,502 B2 | 7/2004 | Mattsson et al. | |
| 6,848,720 B2 * | 2/2005 | Carns et al. | 285/123.15 |
| 2002/0121778 A1 | 9/2002 | Tigerfeldt | |
| 2003/0006611 A1 | 1/2003 | Shuey | |
| 2003/0160452 A1 | 8/2003 | Mattson et al. | |

FOREIGN PATENT DOCUMENTS

JP        8-178404        7/1996

* cited by examiner

APPARATUS FOR A FIRE-RATED DUCT

FIELD OF THE INVENTION

The present invention relates to ducting systems, and more particularly to a fire-rated duct.

BACKGROUND OF THE INVENTION

Large buildings must provide a safe path of egress for the occupants in case of fire. To achieve this, floors and walls are fire rated to prevent fire from traveling from one compartment or floor to another. To allow persons to escape the building, fresh air is also essential to prevent the occupants from being overcome by smoke while attempting to exit the building. To achieve this the ducts that are designed to deliver fresh air during a fire must be constructed so that even if the duct passes through a fire compartment that is fully engulfed in fire, the construction of the duct will withstand the effects of the fire and permit the continuous flow of fresh air to the persons evacuating the building.

An example of the application of fire rated duct system is a stair pressurization system which is typically mandated by building codes for high rise buildings. The stair pressurization system delivers a continuous supply of fresh air which: (a) supplies breathable air to the persons existing via the stairwell; (b) pressurizes the stairwell to prevent the passage of smoke from any floors exposed to fire conditions into the stairwell; (c) assists in removing any smoke that may have entered the stairwell during the opening and closing of doors.

Building codes in the United States and Canada require that products and systems used for fire protection systems are tested and listed by a recognized listing authority with most jurisdictions preferring UL/ULC.

Durasystems Barriers Inc., in Vaughan, Ontario, presently produces two listed fire-rated duct systems referenced as FRD-1 and FRD-2. The FRD-1 fire-rated duct system is a 2 hour UL/JLC Listed ventilation duct that is comprises of a support framework fabricated from ⅛" (3 mm) thick steel that is welded into the required type of fitting and then clad with a fire resistant composite panel using specially tested fasteners. While effective in a fire, the FRD-1 duct system is expensive due to the labour involved in the manufacture of the product and its increased weight due to the thickness of steel required to support the panels make it less economical than many of the other competing products. The FRD-2 fire-rated duct system is a 2 hour ULC Listed duct and is similar to FRD-1 duct system in outer appearance but one of its principal applications is for use as a kitchen exhaust and solvent recovery duct system. The FRD-2 duct system comprises a double wall construction with a welded inner liner, an insulated cavity and FRD-1 as an outer casing. While effective in use where fire temperatures could reach high levels in a relatively short time, the additional weight of the inner liner and insulation as well as the additional fabrication costs resulting from the addition of the inner assemblies makes this system only practical for special applications.

A number of ceramic insulation manufacturers provide "wrap systems" that involve wrapping previously installed ventilation systems with one or two layers of ceramic insulation that has a foil scrim outer layer. Each insulation wrap is overlapped by the next wrap and sealed with foil backed tape to create a seal. Each end overlaps the starting end as well so that there is no butt seams in the system. Stainless steel bands are then wrapped around the outer layer of insulation which holds the insulation in place during a fire.

Perceived shortcomings of these systems include: (a) the need for multiple skilled tradesmen to install the finished system that can result in project scheduling issues; (b) ease of damage to the aluminum scrim outer coating that could result in a reduced fire resistance level and lead to the spread of ceramic fibers throughout the building; (c) the inability to ensure the system is correctly installed as per the factory guidelines; improper installation could result in a system offering little or no protection; (d) the thickness of the insulation wrap material results in an increased outer dimension for the duct work.

In the art, there are also systems that employ different types of fire resistant boards as a cladding which are installed after the ductwork is installed. Each board system has a different installation method which normally involves applying a mastic material to the edges of the boards to be joined and then nailing, stapling or banding the boards together to prevent separation in a fire. The drawback of such board systems include: (a) as with the insulation wraps, there is the need for multiple tradesmen to install the finished system which can result in project scheduling issues; (b) the fire-resistant cladding boards are subject to being damaged from impacts during or after installation; (c) the fire-resistant cladding boards are also susceptible to damage when exposed to high levels of moisture; (d) it is also not always possible to ensure installation of the fire-resistant cladding as per the manufacturers guidelines; and improper installation may result in a system offering little or no protection.

In view of the foregoing, there still remains a need for a fire-rated ducting system which overcomes shortcomings associated with the known systems.

BRIEF SUMMARY OF THE INVENTION

The present invention provides a fire-resistant duct system that prevents the passage of heat from one fire compartment to another through the components of the duct system. By preventing the passage of heat, the fire is prevented from jumping from one fire compartment to another by igniting combustible in the non fire involved compartment.

In a first aspect, the present invention provides a duct assembly suitable for fire-rated applications, the duct assembly comprises: a liner section having an inner surface and an outer surface and a first end and a second end; a non-combustible layer, the non-combustible layer is attached to and surrounding the outer surface of the duct liner; a flange assembly for the first end of the liner section, the flange assembly is removable from the first end; another flange assembly for the second end of the liner section, the flange assembly is removable from the second end; a fire-resistant sealant applied to joints between the liner section and the flange assemblies to prevent the flow of air between the inner surface of the liner section and exterior to the duct assembly; and wherein one or both of the flange assemblies are connected to the liner section during fabrication at a factory.

In another aspect, the present invention provides a fire-rated duct assembly comprising: an inner duct liner having a first end, a second end, an inner surface and an outer surface; one or more fire-resistant panels, the fire-resistant panels being attached to the outside surface of the inner duct liner using one or more fasteners; a first connector member and fasteners, the fasteners coupling the connector member to one end of the inner duct liner and the fire-resistant panel;

a second connector member and fasteners, the fasteners coupling the second connector member to the second end of the inner duct liner and the fire-resistant panel; wherein the connector members, the inner duct liner and the fire-resistant panels are assembled at a factory so that the duct assembly is shipped as a unit.

In a further aspect, the present invention provides a fire-rated duct assembly comprising: a rectangular inner duct liner having a first end, a second end, an inner surface and an outer surface; a plurality of fire-resistant panels, each of the fire-resistant panels being attached to one side of the outside surface of the rectangular inner duct liner using one or more fasteners; a first flanged connector member and fasteners, the fasteners coupling the first flanged connector member to one end of the rectangular inner duct liner and the fire-resistant panels; a second flanged connector member and fasteners, the fasteners coupling the second flanged connector member to the second end of the rectangular inner duct liner and the fire-resistant panels; a fire-resistant sealant is applied to the inner duct liner and the fire-resistant panels to seal the inner duct liner from air flow exterior to the duct assembly; one of the flanged connector members including a fastening mechanism for connecting one or more of the duct assemblies in a field site; and wherein the flanged connector members, the rectangular inner duct liner and the fire-resistant panels are assembled at a factory so that the duct assembly is shipped as a unit to the field site.

In yet another aspect, the present invention provides a duct assembly for providing a fire-rated conduit, the duct assembly comprises: an inner duct liner having a first end, a second end, an inner surface and an outer surface; one or more fire-resistant panels, the fire-resistant panels are attached to the outside surface of the inner duct liner using one or more fasteners; a first connector member and fasteners, the fasteners couple the connector member to one end of the inner duct liner and the fire-resistant panel; a second connector member and fasteners, the fasteners couple the second connector member to the second end of the inner duct liner and the fire-resistant panel; wherein the connector members, the inner duct liner and the fire-resistant panels are formed into an assembly at a factory, the assembly being shipped as a unit; and wherein the assembly forms a conduit section.

Other aspects and functions of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which.

DETAILED DESCRIPTION OF EMBODIMENTS OF THE INVENTION

Figure 1:
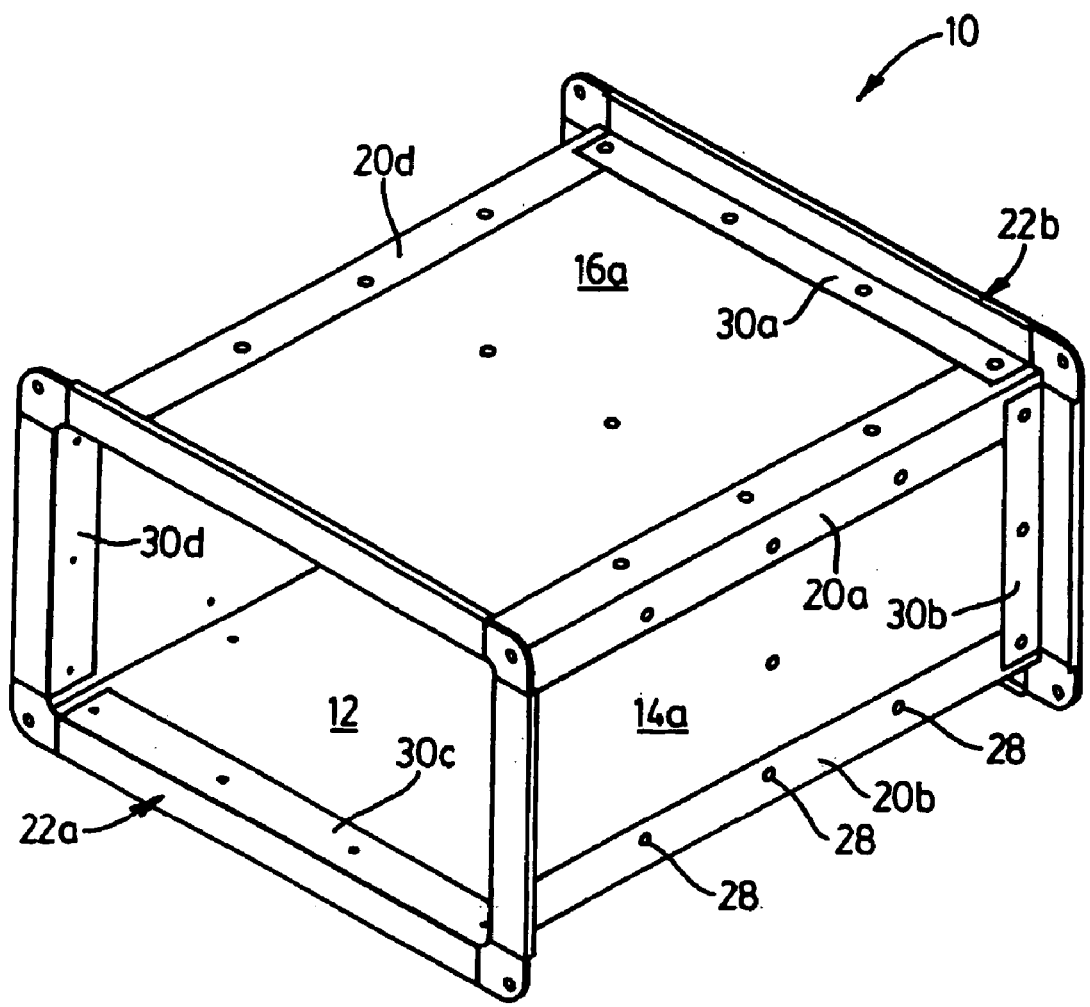
FIG. 1 is an isometric view of a rectangular duct system or assembly in accordance with the present invention.

Reference is first made to FIGS. 1 to 4, which show a fire-rated duct system in accordance with the present invention and indicated generally by reference 10. In the drawings, like references indicate like elements or features.

While the fire-rated duct system 10 is described in the context of an HVAC application, it is to be appreciated that the duct system 10 has wider applicability. The duct system 10 is suitable for other applications including encasing or surrounding electrical wiring and wiring runs, plumbing runs, communication lines and data networks, in addition to smoke evacuation.

As shown, the fire-rated duct system 10 comprises an inner duct liner 12, fire-resistant side panels 14 (shown individually as 14a and 14b), and a fire-resistant top-bottom panel 16 (indicated individually by reference 16a and 16b). The fire-rated duct system 10 also includes corner angle sections 20 (indicated individually by references 20a, 20b, 20c and 20d), and end connector frames 22 (indicated individually by references 22a and 22b).

According to this aspect, the inner duct liner 12 is fabricated from galvanized steel or other metal as required and is formed into a square or rectangular tube. The thickness of the galvanized steel used to fabricate the inner duct liner 12 will vary by the size of the duct being fabricated and should be gauged in accordance with standard ASHRAE or SMACNA guidelines as a minimum. The inner duct liner 12 fabricated according to the guidelines may have thickness ranging between 26 gauge (i.e. on the thin side) to 18 gauge (i.e. on the thick side).

The inner duct liner 12 may be formed as follows: (a) forming one piece of metal into a tube; or (b) forming two pieces of metal into "L" shaped sections and joining them together; or (c) using four separate pieces or panels and joining them to form a tube. To join the pieces together, a male-female joint or lock is formed on the opposing longitudinal edges of the panels that are to be joined together. Due to the stresses that may be exerted during a fire, it is preferred that the longitudinal joint of the tube be of either a snap lock or a 'Pittsburgh-type' lock mechanism. If the snap lock is used, rivets are used for reinforcement through the male-female joint to prevent the male leg of the lock from popping out of the female pocket.

The fire-resistant side panels 14 and the fire-resistant top-bottom panels 16 are cut so that the corners of bottom-top panel 16 overlaps the side panel 14 at the corner by the thickness of the side panel 14 so as to form a closed corner. The fire-resistant side panels 14 are attached to the inner liner 12 to form edges that are flush with the ends 18 of the inner duct liner 12. The fire-resistant panels 14 and 16 are attached to the inner liner 12 by drilling two holes 24a and 24b through the fire-resistant panel 16 and the inner liner 12 at the approximate midpoint of the inner liner 12. The holes 24a and 24b may be spaced approximately 6" to 8" (150 to 200 mm) apart. Steel or stainless steel rivets 26 (FIG. 3) are inserted through the holes 24a and 24b and mechanically drawn tight which results in the inner liner 12 and the fire-resistant panels 14, 16 being drawn together.

Prior to attaching the top and bottom fire-resistant panels 16a and 16b to the inner duct liner 12, a ⅛" (3 mm) bead of fire-resistant sealant is placed along the top and bottom longitudinal edges 15 of the side fire-resistant panels 14a and 14b. This serves to form a seal and fill any voids between the top 16a and bottom 16b fire-resistant panels and the side fire-resistant panels 14a and 14b. As described above, the end edges 17 of the top and bottom panels 16*a* and 16*b* are aligned with the end edges 19 of the side panels 14*a* and 14*b*.

Figure 2:
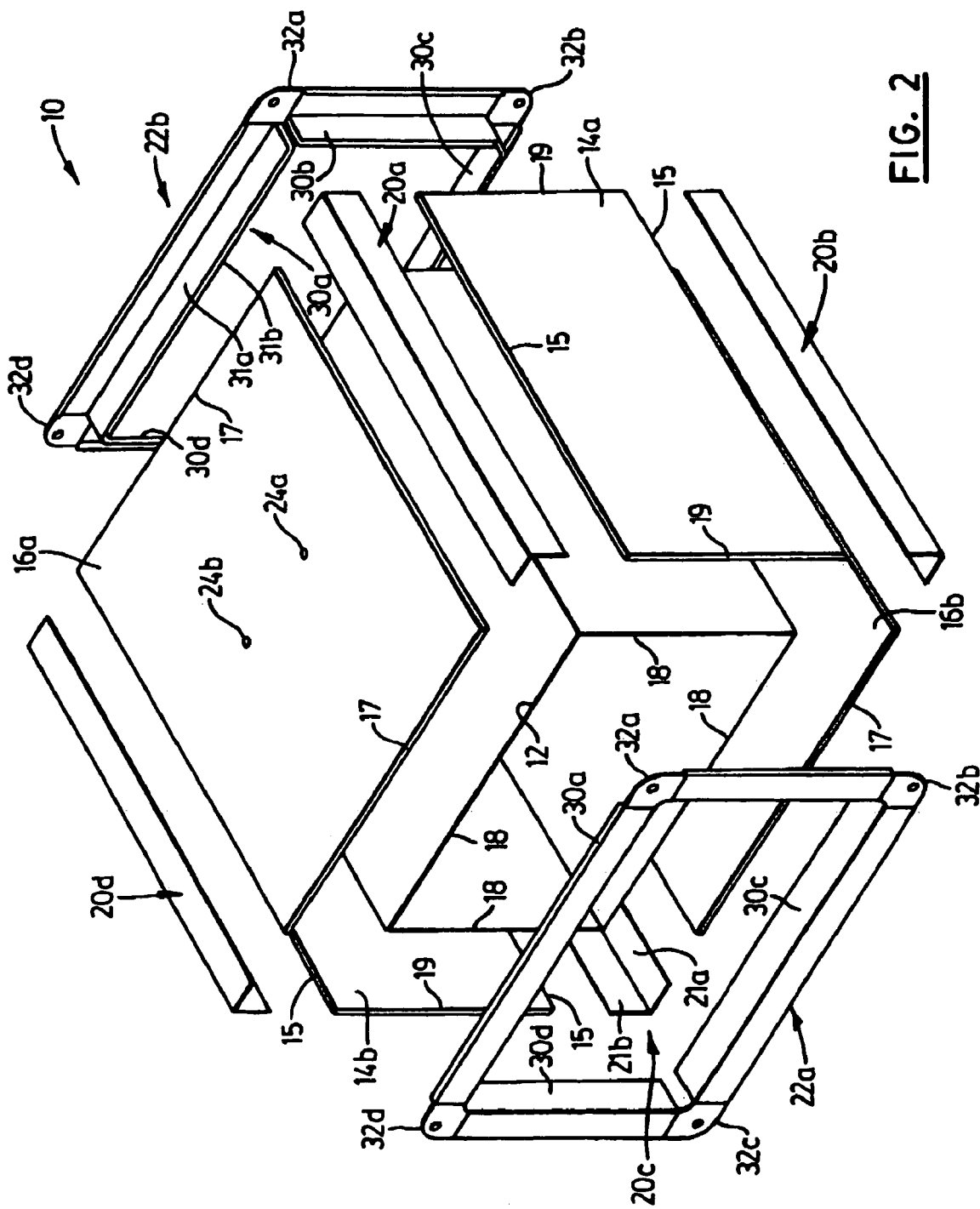
FIG. 2 is an exploded isometric view of the duct assembly shown in FIG. 1.
Figure 3:
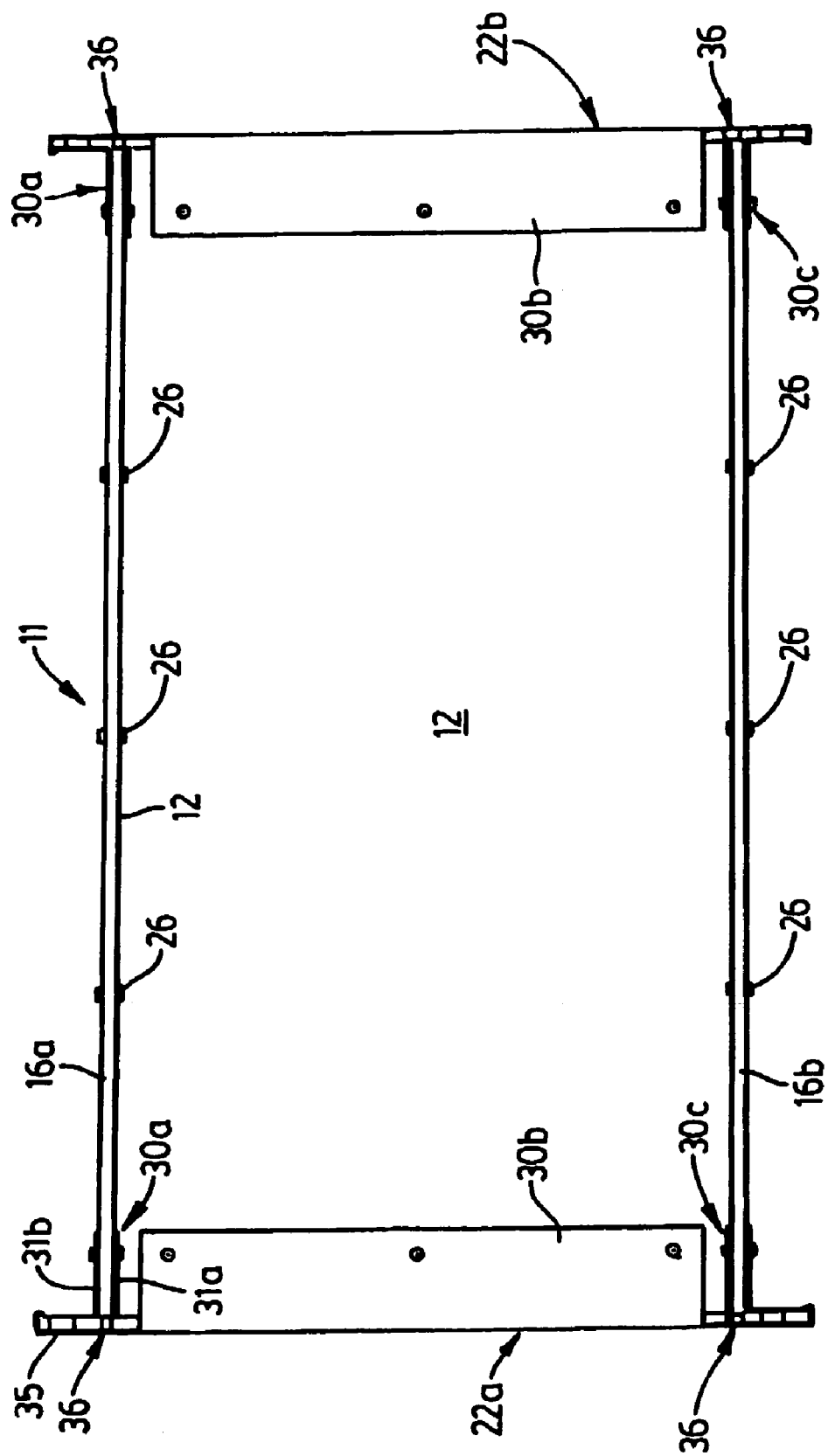
FIG. 3 is a longitudinal cross-sectional view of the duct assembly shown in FIG. 1.

The corner angle members 20 are fabricated from steel, for example, a flat light gauge galvanized steel, and are formed so as to create a 90 degree bend with equal legs 21 (FIG. 2) measuring approximately 2" (50 mm). The corner angle members 20 are installed over each of the corners formed by the longitudinal edges of the respective top and bottom fire-resistant panels 16 and the respective side fire-resistant panels 14. The corner angle members 20 create a finished corner and also a structure joint while minimizing thermal transfer. The corner angle members 20 include holes for receiving fasteners 28, such as rivets, as shown in FIGS. 1 and 3. The holes in the corner angle members 20 are aligned with respective holes in the fire-resistant panels 14 and 16 and in the inner duct liner 12. The holes in the corner angle members 20 may be punched during fabrication, or alternatively, the holes may be drilled through the corner angle members 20, the respective fire-resistant panel 14 or 16, and the inner liner 12. The holes are located about 1" (50 mm) from the edge of the corner angle members 20. As shown in FIGS. 1 and 3, additional holes are drilled on both legs 21 each of the corner angle members 20 at approximate 8" (200 mm) centers starting approximately 9" (225 mm) from the end 18 (FIG. 2) of the inner liner 12 so that the spacing between the fasteners are equal. The fastener 28, e.g. the rivet, is inserted through the hole and by mechanical means is drawn tight which results in the inner liner 12, the respective fire-resistant panels 14 or 16, and the corner angle member 20 being drawn together. In addition to rivets, suitable fasteners 28 include screws, bolts, and the like.

Figure 4:
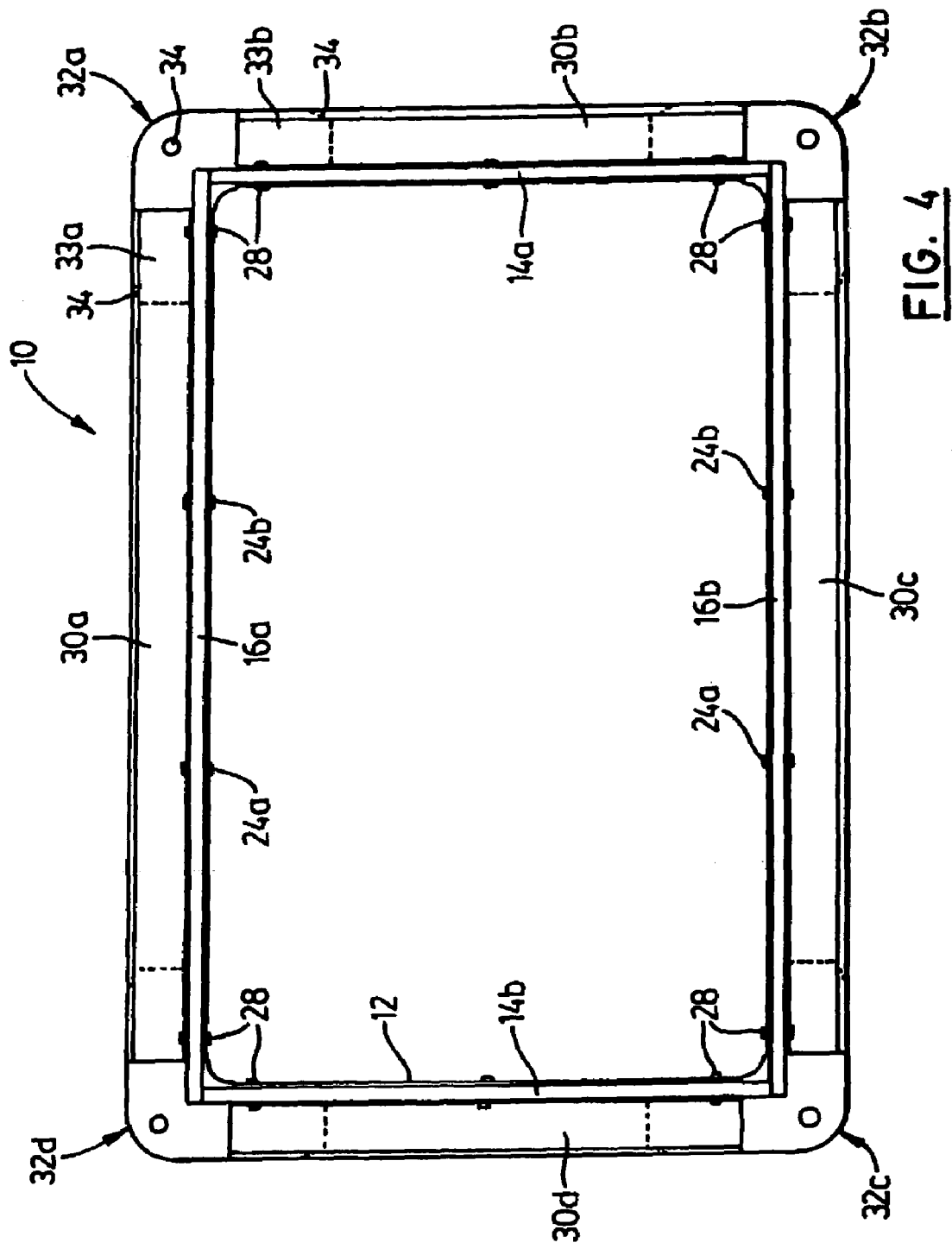
FIG. 4 is a cross-sectional view of the duct assembly shown in FIG. 1.

The end connector frames 22 comprise four flange profile sections 30 and four corner pieces 32. As shown in FIGS. 2 and 4, the flange profile sections 30 are indicated individually by references 30*a*, 30*b*, 30*c* and 30*d*, and the corner pieces 32 are indicated individually by references 32*a*, 32*b*, 32*c* and 32*d*. The flange profiles 30 are fabricated as roll formed flange and the corner pieces 32 are stamped using die fabrication techniques. The roll formed flange 30 includes parallel legs 31 (shown as 31*a* and 31*b* in FIG. 2). The stamped corner piece 32 has two equal legs 33 (indicated by references 33*a* and 33*b* and shown in broken outline in FIG. 4) that form a 90 degree angle with a hole 34 for a fastener located approximately at the intersection between the midpoints of each leg 33. The parallel legs 31 are formed having a spacing so that the leg 33 of the corner piece 32 is slid into place with a slight friction fit. The friction fit prevents the finished end connector frame 22 from being fabricated out of square. The two parallel legs 31 (FIG. 2) are formed so that the distance between the inner 31*b* and outer 31*a* legs is equal to the mean thickness of the inner duct liner 12 and the fire-resistant panels 14 or 16. This distance is consistent and should allow for the variances in the thickness of the inner liner 12. The thickness of the inner liner 12 may vary from a low of 0.021" (0.5 mm) to a high of 0.051" (1.3 mm).

The inner duct liner 12 connected to the fire-resistant side 14 and top 16 panels, and the connected corner angle members 20 form a duct section 11. The duct sections 11 (shown individually as 11*a* and 11*b* in FIG. 5) are connected together using the end connector frames 22 (shown individually as 22*a* and 22*b* in FIG. 5) as will be described in more detail below.

Referring to FIG. 4, each leg 33 of the corner piece 32 has a shoulder 34 that terminates approximately ½" (12.5 mm) from the perpendicular leg. The shoulder 34 provides a stop for the flange profile section 30, when the leg 33 of the corner piece 32 is inserted between the parallel legs 31 of the flange profile section 30. With a ½×" (12.5 mm) shoulder 34, the inner leg 31*b* of the roll formed flange profile 30 does not interfere with the mechanical lock used on the inner liner 12. Furthermore, each roll formed flange profile section 30 is cut approximately 1" (25 mm) shorter than the inside dimension of the required duct section so that when the end connector frame 22 is assembled the distance between inner face of the legs 31*a* of the opposing roll formed flange profile 30 is equal to the inside dimension of the inner duct liner 12.

As will be described in more detail below, each of the duct sections 11 (for example, the duct section 11*a* and the duct section 11*b*, shown in FIG. 5) requires two complete end connector frames 22. Prior to installing each of the connector frames 22, a bead of fire-resistant sealant 36 as shown in FIG. 4. The fire-resistant sealant 36 comprises a bead of about ¼" to ⅜" (6–10 mm) which is injected between the horizontal legs 31 of each one of the roll formed flange profile sections 30 so that said bead is resting against the vertical leg 35 (FIG. 4) of the flange profile section 30.

The connector frame 22 is slid over the end of the duct section 11 and is pushed on until the end of the duct section 11 comes into contact with the corner pieces 32 of the connector frames 22. At this point the end of the duct section 11 is also sealed to the connector frame 22 by embedding the end of the duct section 11 into the bead of the fire resistant sealant 36. Referring to FIG. 3, the connector frame 22 is attached to the duct section 11 by drilling through the outer horizontal leg 31*b* of the roll formed flange section 30*a* at a point 1" (25 mm) from the edge of the leg and ½" (12 mm) from the end of the leg 31*b*. The hole should continue through the fire-resistant panel 16*a* (or fire-resistant panel 14 for the sides of the duct section 11), through the inner duct liner 12 and through the inner horizontal leg 31*a* of the flange section 30*a* (FIG. 3). A rivet 38 is inserted into the hole and drawn tight by mechanical means so that the horizontal legs 31 of the flange section 30*a* are pulled tight with the fire-resistant panel 16*a* and the inner liner 12 to form the duct section 11. This is repeated at the opposite end of the flange 30*a* and at approximately 8" (200 mm) centers between the end attachments. This procedure is repeated for each of the flange sections 30 of the connector frame 22. For a field modifiable configuration, the rivets 38 are substituted with removable fasteners such as a bolt and nut arrangement. This allows the flange sections 30, i.e. the connector frame 22, to be removed in the field or the connector frame 22 to be shipped separate from the duct system 10 which is assembled at a factory site.

The connector frames 22*a* and 22*b* are typically attached to both ends of the duct section 11 (following the procedure as described with reference to FIG. 3) during fabrication at the factory prior to shipping. In some applications, the duct section 11 is shipped with one attached connector frame 22, and one unattached connector frame 22, for example, to permit the installation of the duct section 11 through an existing opening in the floor or wall. The uninstalled connector frame 22 is then attached to the duct section 11 in the field in the manner as described above with reference to FIG. 3. Once the connector frames 22 are installed, the longitudinal seams of the inner duct liner 12 and the interface between the inner duct liner 12 and the corner pieces 32 should be sealed with the fire resistant sealant 36, as used to seal the flange profile section 30 to the inner duct liner 12 (as described above) to create an airtight seal.

Figure 5:
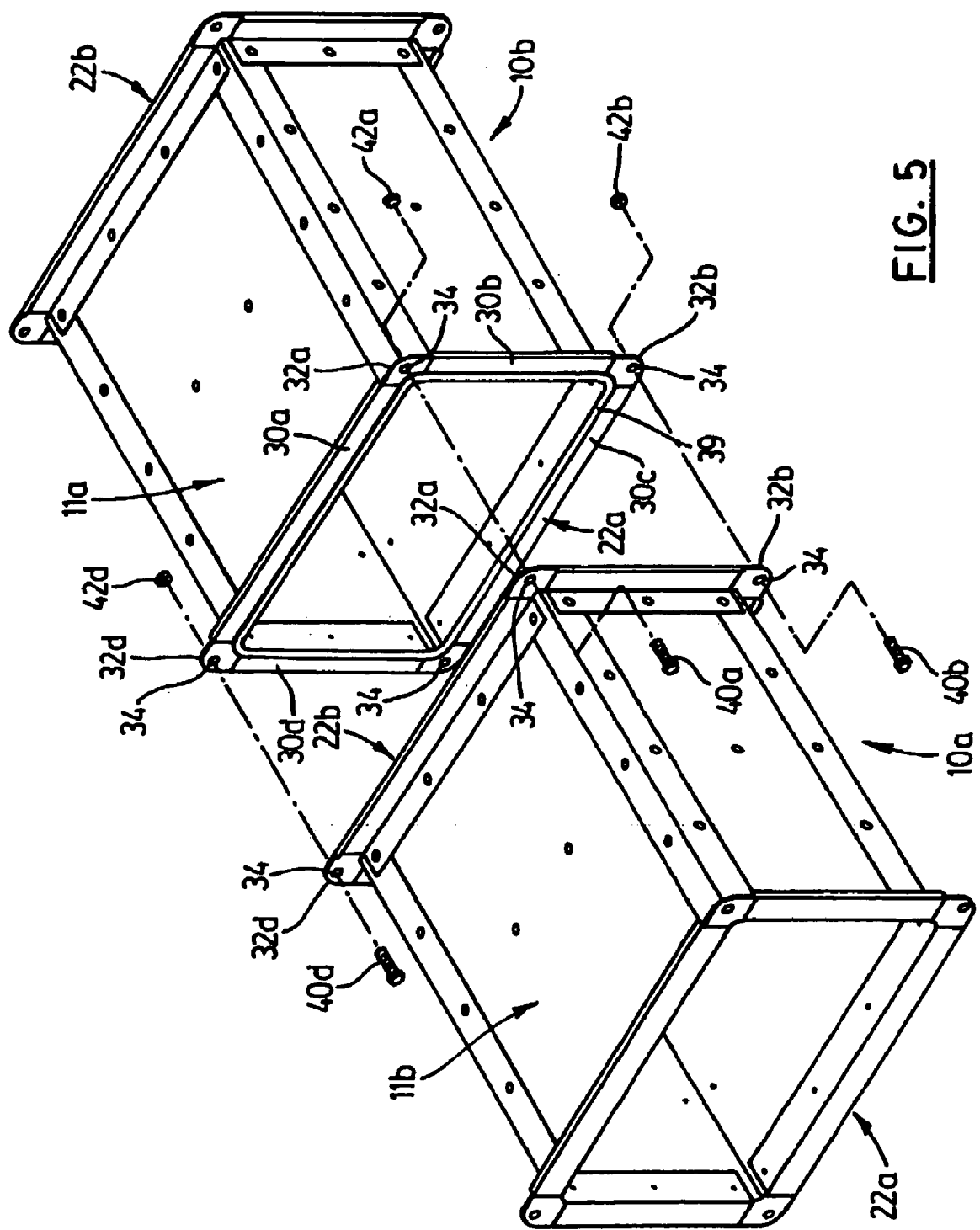
FIG. 5 is an isometric view showing a mechanism for joining duct sections together according to the present invention.
Figure 6:
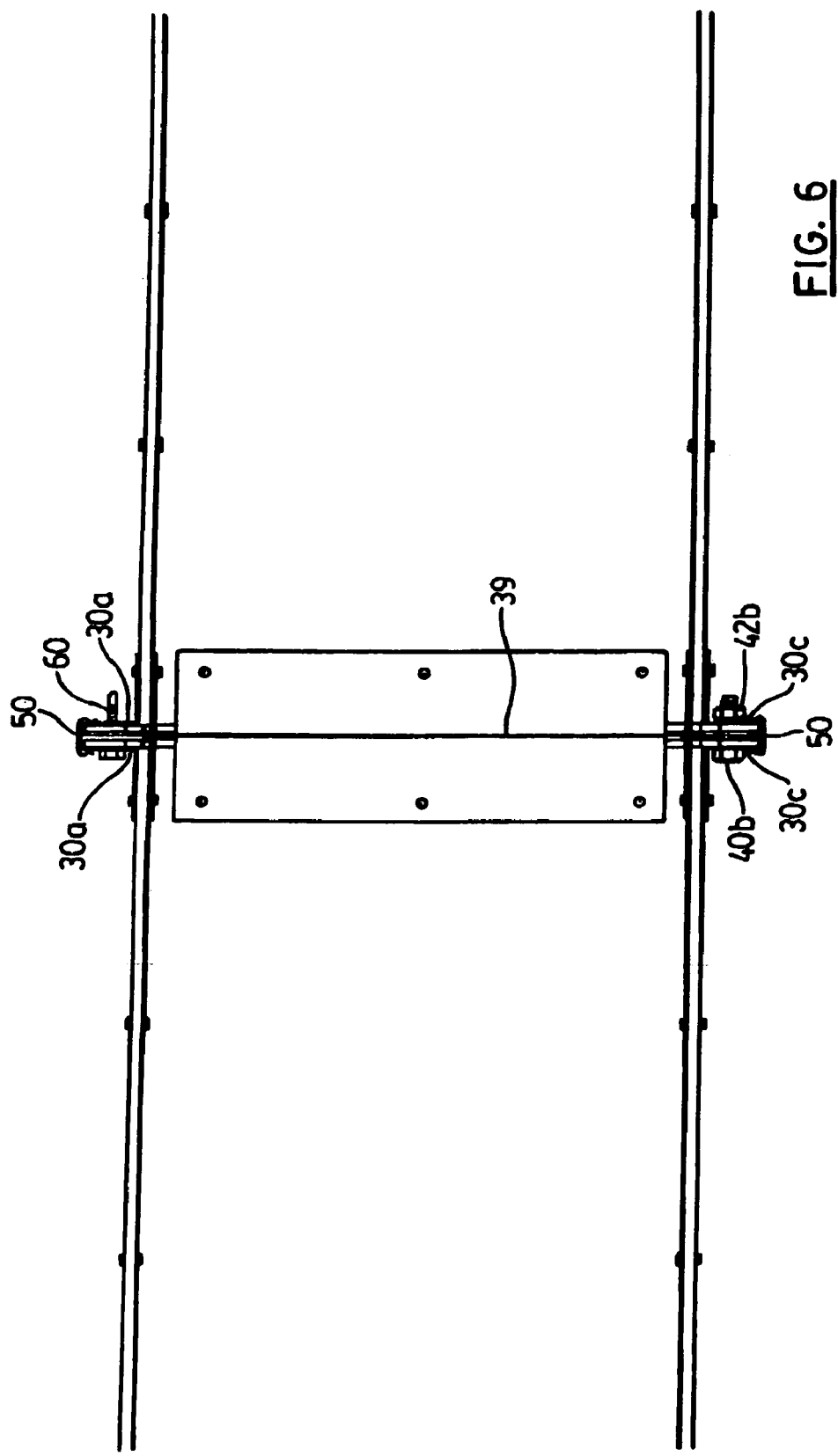
FIG. 6 is a longitudinal cross-sectional view of the assembled duct sections shown in FIG. 5.

Reference is next made to FIGS. 5 and 6, which illustrate a method for connecting together a first duct section 11*a* to a second duct section 11b according to another aspect of the present invention. As shown, a fire resistant sealant 39 is applied to the connector frame 22 of the first duct section 11a. The fire-resistant sealant 39 is applied to be located within the lower half of the flange sections 30 relative to the inner duct liner 12. The fire-resistant sealant may comprise either a mastic or a tape and is applied immediately prior to joining together the duct sections 11a and 11b. The second duct section 11b is drawn towards the first section so that the holes 34 in the corner pieces 32 on the respective connector frames 22 are aligned.

As shown in FIG. 5, bolt fasteners 40 (indicated individually as 40a, 40b, 40c, 40d) and nut fasteners 42 (indicated individually as 42a, 42b, 42c, 40d) are used to couple together adjacent connector frames 22. For example, the bolt 40a is inserted through the holes 34 for respective corner pieces 32a, and the nut 42a is tightened finger tight. The bolts 40b, 40c, 40d and the nuts 42b, 42c, 42d are applied to the other corner pieces 32b, 32c, 32d and finger tightened. Each of the bolts 40 is then tightened with a wrench until snug and the mating faces of the respective corner pieces 32 are touching.

Due to the variety of sizes possible for the duct sections 11, it may be necessary to install additional fasteners between adjacent corner pieces 32, for example, the corner pieces 32a and 32d, and the corner pieces 32b and 32c. The additional fasteners are provided to prevent the flange sections 30 from separating at a midpoint between the corner bolts 40, for example, during fire situations.

Reference is next made to FIG. 6 which shows two possible mechanisms of preventing the roll formed flange sections 30 from separating under fire conditions. The first mechanism comprises a roll formed retention clip 50. The shape of and roll forming process for fabricating the retention clip 50 provides a spring-like force which securely holds the adjacent flange sections 30 together when the clip 50 is applied or snapped over the top edges of the flange sections 30. For typically duct sizing, the roll formed retention clips 50 are approximately 6" (150 mm) long and mounted on approximate 12" (300 mm) centers. The length of the clip 50 and centers will vary due to the duct size.

Referring still to FIG. 6, the second mechanism comprises using self-drilling/self-tapping screws 60. The screws 60 are installed through the vertical legs of the roll formed flange pieces 30. The screws 60 are located approximately on center of the vertical legs and installed on approximately 6 to 8" (150 to 200 mm) centers.

In accordance with an aspect of the present invention, the fire-rated duct assembly 10 is assembled at the factory and delivered to a job site. At the job site, one or more of the connector flange ends 22 may be removed (i.e. using removable fasteners) to permit the duct section 11 to be modified, e.g. cut to length or passed a precut opening, and then the connector flange member 22 is reconnected using the fasteners. By providing this capability, the duct assembly 10 is field modifiable without necessary voiding the UL rating or other certifications or approvals. This in turn prevents project delays due to the time needed for factory fabrication of sized duct sections.

In accordance with another aspect of the invention, the duct assembly 10 is shipped from the factory with one of the connector flange member 22 separate from the duct section 11. This allows installation of the duct section 11 in the field, for example, through an existing or undersized opening in a wall or slab floor, that would not be possible with the connector flange member 22 installed on the duct section 11.

The present invention may be embodied in other specific forms without departing from the spirit or essential characteristics thereof. Other adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A duct assembly suitable for fire-rated applications, said duct assembly comprising:
    a liner section having an inner surface and an outer surface and a first end and a second end, and said liner section being formed from a thin steel material;
    a non-combustible layer, said non-combustible layer being attached to and surrounding the outer surface of said liner section;
    a flange assembly for the first end of said liner section, said flange assembly being removably coupled to said first end;
    another flange assembly for the second end of said liner section, said flange assembly being removably coupled to said second end;
    at least one longitudinal member having a first end for connecting to said flange assembly and a second end for connecting to said other flange assembly, and having a surface for securing a portion of said non-combustible layer and said liner section;
    a fire-resistant sealant applied to joints between said liner section and said flange assemblies to prevent the flow of air from the inner surface of said liner section to exterior of said duct assembly; and
    wherein one or both of said flange assemblies are coupled to said liner section during fabrication at a factory.

2. The duct assembly as claimed in claim 1, wherein one or both of said flange assemblies include a fastening mechanism for connecting one or more of said duct assemblies.

3. The duct assembly as claimed in claim 2, wherein said non-combustible layer comprises a fire-resistant panel attached to said liner section by a plurality of fasteners.

4. The duct assembly as claimed in claim 3, wherein said non-combustible layer comprises more than one rated fire-resistant panels.

5. A fire-rated duct assembly comprising:
    an inner duct liner having a first end, a second end, an inner surface and an outer surface;
    at least one fire-resistant panel, said at least one fire-resistant panel being attached to the outer surface of said inner duct liner using one or more fasteners;
    a first end connector member and fasteners therefor, said fasteners coupling said end connector member to one end of said inner duct liner and said at least one fire-resistant panel;
    a second end connector member and fasteners therefor, said fasteners coupling said second end connector member to said second end of said inner duct liner and said at least one fire-resistant panel;
    a plurality of longitudinal connector members having a first end and fasteners therefor for connecting to said first end connector member and a second end and fasteners therefor for connecting to said second end connector member, and having a surface for securing a portion of said at least one fire-resistant panel and fasteners therefor;

wherein said connector members, said inner duct liner and said at least one fire-resistant panel are assembled at a factory so that said duct assembly is shipped as a unit.

6. The fire-rated duct assembly as claimed in claim 5, wherein said connector members include a fastening mechanism for connecting one or more of said duct assemblies in the field.

7. The fire-rated duct assembly as claimed in claim 5 or 6, wherein said fasteners for one of said connector members comprise removable fasteners for disconnecting and reconnecting said one connector member for said duct assembly so that said duct assembly is modifiable in a field installation.

8. The fire-rated duct assembly as claimed in claim 5 or 6, wherein the fasteners for one of said connector members are able to be installed in the field and said one connector member is shipped separate from the duct assembly so that the duct assembly is able to be modified in the field.

9. A fire-rated duct assembly comprising:
    a rectangular inner duct liner having a first end, a second end, an inner surface and an outer surface;
    a plurality of fire-resistant panels, each of said fire-resistant panels being attached to one side of the outer surface of said rectangular inner duct liner using one or more fasteners;
    a first flanged connector member and fasteners therefor, said fasteners coupling said first flanged connector member to one end of said rectangular inner duct liner and said fire-resistant panels;
    second flanged connector member and fasteners therefor, said fasteners coupling said second flanged connector member to the second end of said rectangular inner duct liner and said fire-resistant panels;
    a plurality of longitudinal connector members having a first end and fasteners therefor for connecting to said first flanged connector member and a second end and fasteners therefor for connecting to said second flanged connector member, and having a surface for securing a portion of said fire-resistant panels;
    one of said flanged connector members including a fastening mechanism for connecting one or more of said duct assemblies at a field site;
    a fire-resistant sealant applied to said inner duct liner and said fire-resistant panels to seal said inner duct liner from air flow exterior to the duct assembly; and
    wherein said flanged connector members, said rectangular inner duct liner and said fire-resistant panels are assembled at a factory so that said duct assembly is shipped as a unit to the field site.

10. The fire-rated duct assembly as claimed in claim 9, wherein said fasteners for one of said flange connector members comprise removable fasteners for disconnecting and reconnecting said one flange connector member for said duct assembly so that said duct assembly is modifiable at the field site.

11. The fire-rated duct assembly as claimed in claim 10, wherein the fasteners for said one flanged connector member are able to be installed in the field and said one flange connector member is shipped separate from the duct assembly so that the duct assembly is able to be modified in the field.

12. The fire-rated duct assembly as claimed in claim 9, wherein the fasteners for one of said flange connector members are able to be installed in the field and said one flange connector member is shipped separate from the duct assembly so that the duct assembly is able to be modified in the field.

13. A duct assembly for providing a fire-rated conduit, said duct assembly comprising:
    an inner duct liner having a first end, a second end, an inner surface and an outer surface, and said inner duct liner being formed from a thin steel sheet;
    at least one fire-resistant panel, said at least one fire-resistant panel being attached to the outer surface of said inner duct liner using one or more fasteners;
    a first connector member and fasteners therefor, said fasteners coupling said connector member to one end of said inner duct liner and said at least one fire-resistant panel;
    a second connector member and fasteners therefor, said fasteners coupling said second connector member to the second end of said inner duct liner and said at least one fire-resistant panel;
    a plurality of longitudinal connector members having a first end and fasteners therefor for connecting to said first connector member and a second end and fasteners therefor for connecting to said second connector member, and having a surface for securing a portion of said fire-resistant panel;
    wherein said connector members, said inner duct liner and said fire-resistant panels are formed into an assembly at a factory, said assembly being shipped as a unit; and
    wherein said assembly forms a conduit section.

14. The duct assembly as claimed in claim 13, wherein said conduit sections are coupled together to form a conduit for running electrical wires.

15. The duct assembly as claimed in claim 13, wherein said conduit sections are coupled together to form a conduit for running plumbing.

16. The duct assembly as claimed in claim 13, wherein said conduit sections are coupled together to form a conduit for smoke evacuation.

* * * * *